United States Patent [19]
Dressler

[11] Patent Number: 6,027,084
[45] Date of Patent: Feb. 22, 2000

[54] SUPPORT FOR USE WITH A LAWN ORNAMENT

[76] Inventor: Thomas O. Dressler, 23710 Cottage Rd., Lake Zurich, Ill. 60047

[21] Appl. No.: 09/161,119

[22] Filed: Sep. 25, 1998

[51] Int. Cl.[7] ........................................................ A45F 3/44
[52] U.S. Cl. ............................................. 248/156; 248/146
[58] Field of Search ................................. 248/156, 542, 248/145, 146, 545, 678, 188.1, 188.2, 346.01, 346.05, 364; 119/537, 69.5

[56] References Cited

U.S. PATENT DOCUMENTS

| | | | |
|---|---|---|---|
| 1,902,423 | 3/1933 | Seltzer | 47/39 |
| 2,253,172 | 8/1941 | Fetterman | 108/158.11 |
| 2,861,764 | 11/1958 | Fisher | 248/146 |
| 3,280,744 | 10/1966 | Brown | 102/358 |
| 3,662,771 | 5/1972 | Gravatt | 135/15.1 |
| 3,713,620 | 1/1973 | Tkach | 248/678 |
| 3,762,672 | 10/1973 | Tabbert | 248/146 |
| 4,717,110 | 1/1988 | Fohrman | 248/545 |
| 4,942,962 | 7/1990 | Jordan | 206/315.7 |
| 5,065,975 | 11/1991 | Giles | 248/545 |
| 5,123,623 | 6/1992 | Mc Namara | 248/545 |
| 5,479,880 | 1/1996 | Stuhr et al. | 119/57.8 |

*Primary Examiner*—Derek J. Berger
*Assistant Examiner*—Anita M. King
*Attorney, Agent, or Firm*—Brinks Hofer Gilson & Lione

[57] ABSTRACT

A support for use with a lawn ornament and the lawn of a user. The lawn ornament has a base. The support includes a substantially planar support surface adapted to support the base of a lawn ornament in a substantially level position. The support also includes a lawn insertion member and a leveling mechanism. The lawn insertion member is adapted to be readily inserted in the lawn and secure the support surface to the lawn in stable position. The leveling mechanism is adapted to indicate that the support surface is positioned in a level position whereby the support surface provides a level support for the lawn ornament.

14 Claims, 2 Drawing Sheets

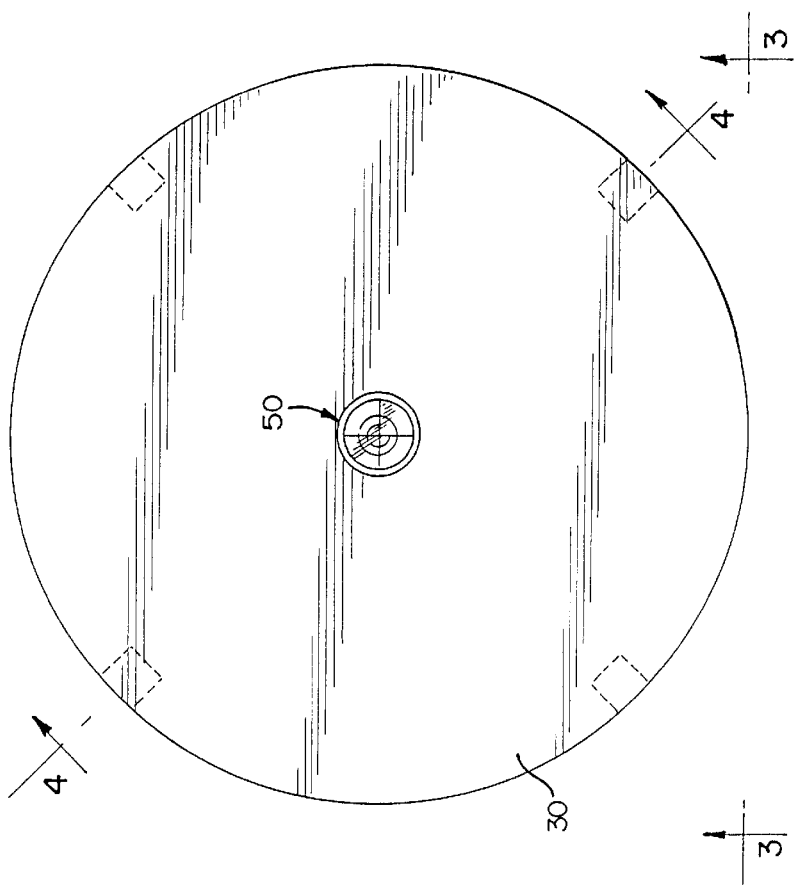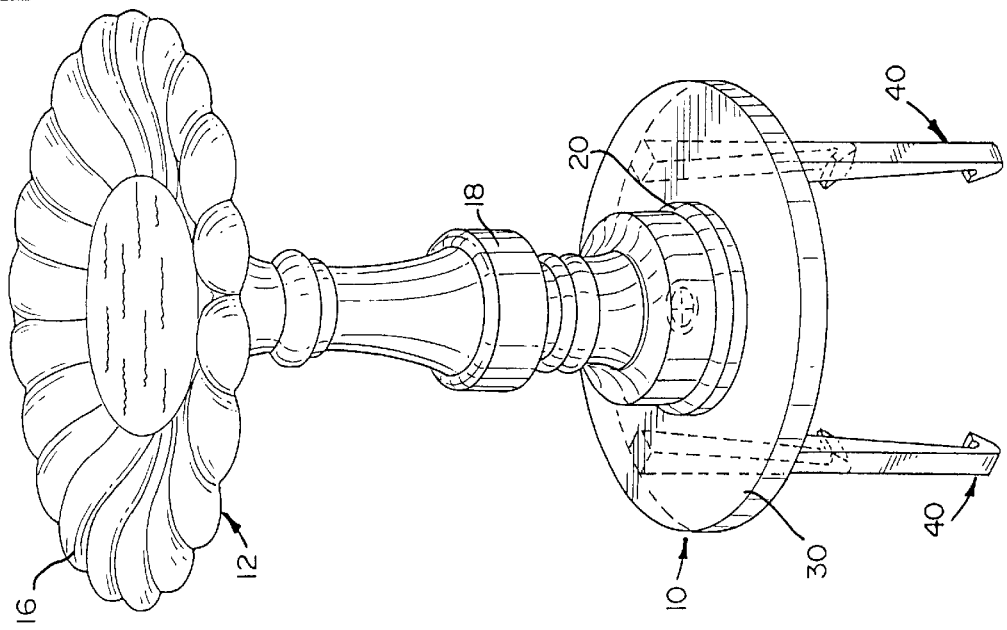

SUPPORT FOR USE WITH A LAWN ORNAMENT

BACKGROUND OF THE INVENTION

The present invention relates to a support for use with a lawn ornament. More specifically, the invention relates to a support operable to provide a level surface which helps prevent tipping of the lawn ornament.

Lawn ornaments such as bird baths or other ornamental structures have been used for decorative reasons for many years. However, the use of conventional lawn ornaments has been problematic. In particular, many lawn ornaments have a problem with stability. Many yards have an irregular surface which prevents the flat base of the lawn ornament from resting coplanar, or in other words, level with the yard. Rather, the lawn ornament rests in an somewhat unstable angled position. In addition, gaps beneath and adjacent the lawn ornament base may exist. As a result, the lawn ornament can rest in an unstable position thereby subjecting it more readily to tipping. This instability problem is often further amplified with many bird bath constructions where a substantial portion of the weight of the bird bath is spread out over an area larger than the base and spaced upward from the base a significant distance.

The instability of these conventional lawn ornaments results in a number of disadvantages for the user. For example, if the lawn ornament is tipped, the user will suffer the inconvenience of having to replace the ornament in its original position. In addition, it is also possible that the lawn ornament may be broken by the fall. Accordingly, a number of disadvantages result from the use of lawn ornaments having a conventional construction.

Therefore, there is a need for a support structure adapted to readily accommodate the base of a lawn ornament and provide a level support for structure.

SUMMARY OF THE INVENTION

The present invention is directed to a novel support for a lawn ornament and a lawn ornament system each of which has a unique combination of advantages not found in the prior art.

According to a first aspect, the present invention is directed to a support for use with a lawn ornament and the lawn of a user. The support includes a substantially planar support surface adapted to support the base of a lawn ornament in a substantially level position. The support also includes a lawn insertion member and a leveling mechanism. The lawn insertion member is adapted to be readily inserted in the lawn to secure the support surface to the lawn in stable position. The leveling mechanism is adapted to indicate that the support surface is placed in a level position whereby the support surface provides a level support for the lawn ornament.

According to another aspect of the invention, a lawn ornament and support system for use with the lawn of a user is provided. The system includes a lawn ornament having a base and a lawn ornament support separate from the base of the lawn ornament. The support has a substantially planar support surface adapted to support the base of the lawn ornament in a substantially level position. The support also includes a lawn insertion member adapted to be readily inserted into the lawn to secure the support surface to the lawn in level position.

According to yet another aspect of the invention, a lawn ornament and support system for use with the lawn of a user is provided. The system includes a lawn ornament having a base and a lawn ornament support separate from the base of the lawn ornament. The support has a substantially planar support surface adapted to support the base of the lawn ornament in a substantially level position. The support also includes a lawn insertion member and a leveling mechanism. The lawn insertion member is adapted to be readily inserted into the lawn to secure the support surface to the lawn in a level position. The leveling mechanism is adapted to indicate that the support surface is placed in a level position whereby the support surface provides a level support for the lawn ornament.

As used herein, the term "lawn ornament" is intended to include lawn ornaments of widely varying type, style and use such as bird baths, yard statues or figurines, flower pots, bird feeders and wishing wells.

The present invention, together with attendant objects and advantages, will be best understood with reference to the detailed description below in connection with the attached drawings.

DESCRIPTION OF THE DRAWINGS

FIG. 1 is a front perspective of one preferred embodiment of the system of the present invention including a support and a lawn ornament;

FIG. 2 is a top view of the support according to the preferred embodiment shown in FIG. 1;

DETAILED DESCRIPTION OF THE INVENTION

Figure 3:
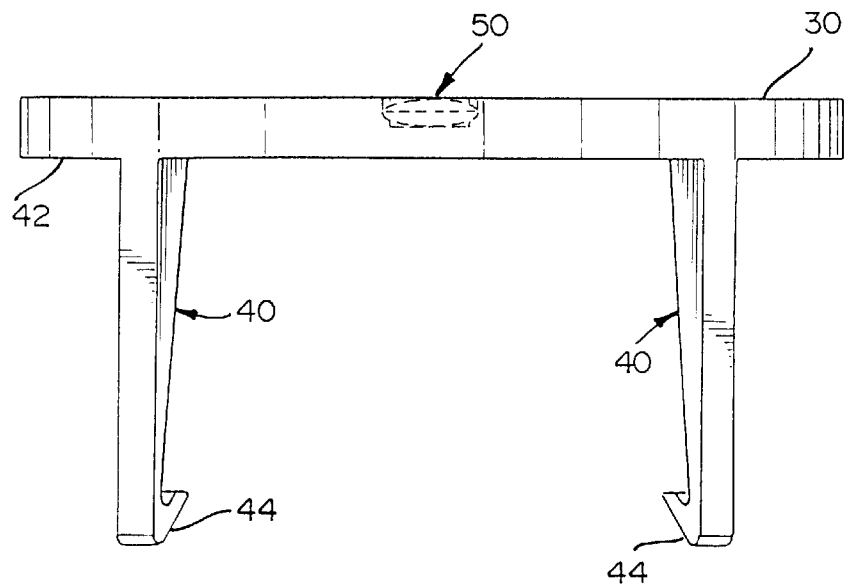
FIG. 3 is a side view of the preferred embodiment of the support shown in FIGS. 1–2 and taken along the lines 3—3 of FIG. 2.

A support 10 for use with a lawn ornament such as the bird bath 12 constructed in accordance with a preferred embodiment is illustrated in FIGS. 1–4. While a bird bath 12 is illustrated in the figures, it should be recognized that the present invention has broad application and is useful with many different types of lawn ornaments. For example, the support 10 is also useful with other types of bird baths, yard statues or figurines, flower pots, bird feeders and wishing wells. Accordingly, the bird bath 12 is only a representative example of the types of lawn ornaments useful with the support 10.

With particular reference to FIG. 1, the bird bath 12 includes an open top portion 16 adapted to receive and contain water. The bird bath 12 also includes a support column 18 and a base 20. The base 20 has a flat bottom surface. The bottom surface 22 is supported by the support 10.

The support 10 includes a top surface 30. The top surface 30 is a substantially planar surface adapted to support the flat surface 22 of the bird bath 12 in a level manner. In the preferred embodiment, top surface 30 is circular in form and has a diameter of at least 12 inches. However, as those of ordinary skill in the art will recognize, a wide variety of shapes such as square or rectangular may be used.

Four legs 40 project downward from a bottom surface 42. The legs 40 include a curved tip 44. In the preferred embodiment the legs 40 are approximately 9 inches in length. The legs 40 may also take other shapes and sizes. They must simply be adapted to adequately secure the support 10 to a user's lawn.

Figure 4:
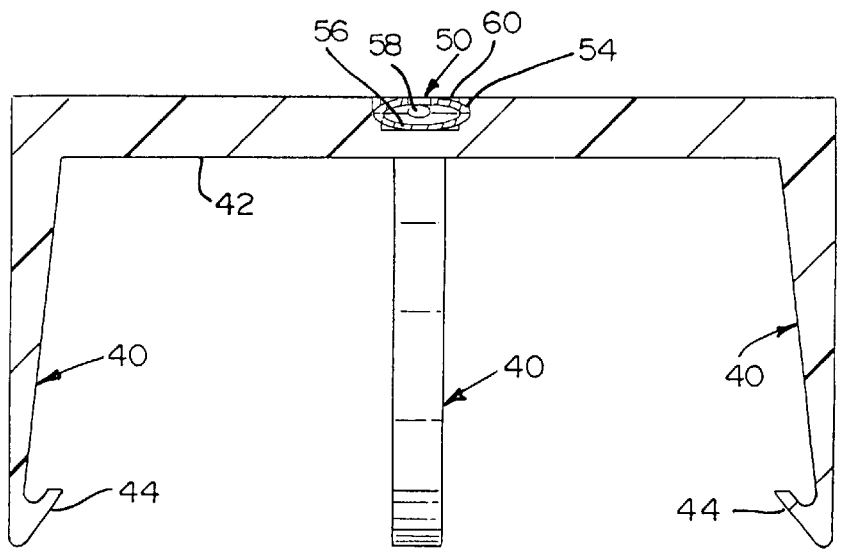
FIG. 4 is a cross-section of the preferred embodiment of the support shown in FIGS. 1–3 and taken along the lines 4—4 of FIG. 2.

The leveling mechanism 50 is best illustrated in FIGS. 2 and 4. The leveling mechanism 50 includes an outer transparent casing 54, a fluid 56 and a leveling bead 58. The outer casing 54 has a curved outer surface 60. The bead 58 is centrally located within the casing when positioned horizontally. It should be recognized, however, that other leveling mechanisms known to those of ordinary skill in the art may be implemented with the present invention.

In use, the support 10 and in particular the legs 40 are inserted into the lawn of a user. The leveling mechanism 50 is consulted to determine whether the support 10 is positioned in a level manner. The support may then be adjusted as necessary in order to place the top surface 30 in a level or horizontal position. Once adjusted to a level position, the lawn ornament 12 may then be placed on the top surface 30 of the support 10 with the base 20 resting on the support in a substantially level or horizontal manner.

The embodiments described above and shown herein are illustrative and not restrictive. The scope of the invention is indicated by the claims rather than by the foregoing description and attached drawings. The invention may be embodied in other specific forms without departing from the spirit of the invention. For example, the support may have many different shapes, sizes and overall constructions without departing from the claimed invention. In addition, the present invention is useful with lawn ornaments of wide varying type, style and use. Accordingly, these and any other changes which come within the scope of the claims are intended to be embraced herein.

I claim:

1. A support for use with the lawn of a user and a lawn ornament
    having a base, the support comprising:
    a substantially planar support surface adapted to support the base of a lawn ornament in a substantially level position;
    a lawn insertion member adapted to be readily inserted in the lawn to secure the support surface to the lawn in a stable position; and
    a leveling mechanism adapted to indicate that the support surface is placed in a level position whereby the support surface provides a level support for the lawn ornament.

2. The support of claim 1 wherein the lawn insertion member is formed from a plurality of fingers.

3. The support of claim 2 wherein four fingers form the lawn insertion member.

4. The support of claim 3 wherein the leveling mechanism provides a visual indication of the relative horizontal position of the support surface.

5. The support of claim 4 wherein the leveling mechanism comprises a transparent casing, a fluid and a slidable indication member.

6. The support of claim 5 wherein the support surface has a diameter substantially greater than nine inches.

7. A lawn ornament and support system for use with the lawn of a user, the system comprising:
    a lawn ornament having a base;
    a lawn ornament support separate from the base of the lawn ornament, the support having a substantially planar support surface adapted to support the base of the lawn ornament in a substantially level position, a lawn insertion member adapted to be readily inserted in the lawn to secure the support surface to the lawn in a level position, and a leveling mechanism adapted to indicate that the support surface is positioned in a level position whereby the support surface provides a level support for the lawn ornament.

8. The system of claim 7 wherein the lawn insertion member is formed from a plurality of fingers.

9. The system of claim 8 wherein the leveling mechanism provides a visual indication of the relative horizontal position of the support surface.

10. The system of claim 9 wherein the leveling mechanism comprises a transparent casing, a fluid and a slidable indication member.

11. The system of claim 10 wherein the support surface is round.

12. The system of claim 11 wherein the fingers include a curved tip.

13. The system of claim 12 wherein the support is formed from a plastic material.

14. The system of claim 13 wherein the leveling mechanism is centrally located on the planar support surface.

* * * * *